June 1, 1965   G. N. MENASOFF ETAL   3,186,618
SEALING APPARATUS
Filed Nov. 30, 1961
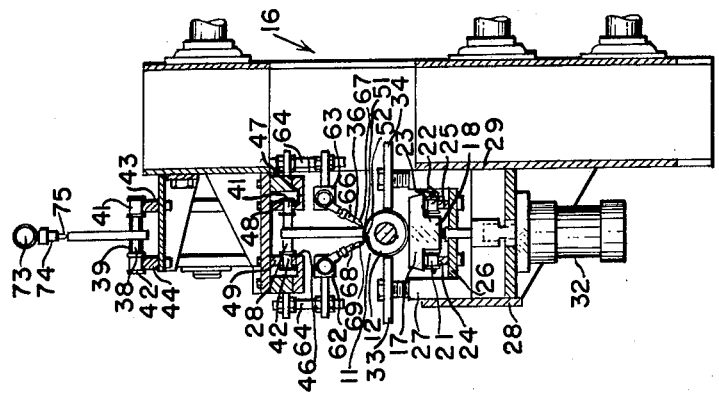
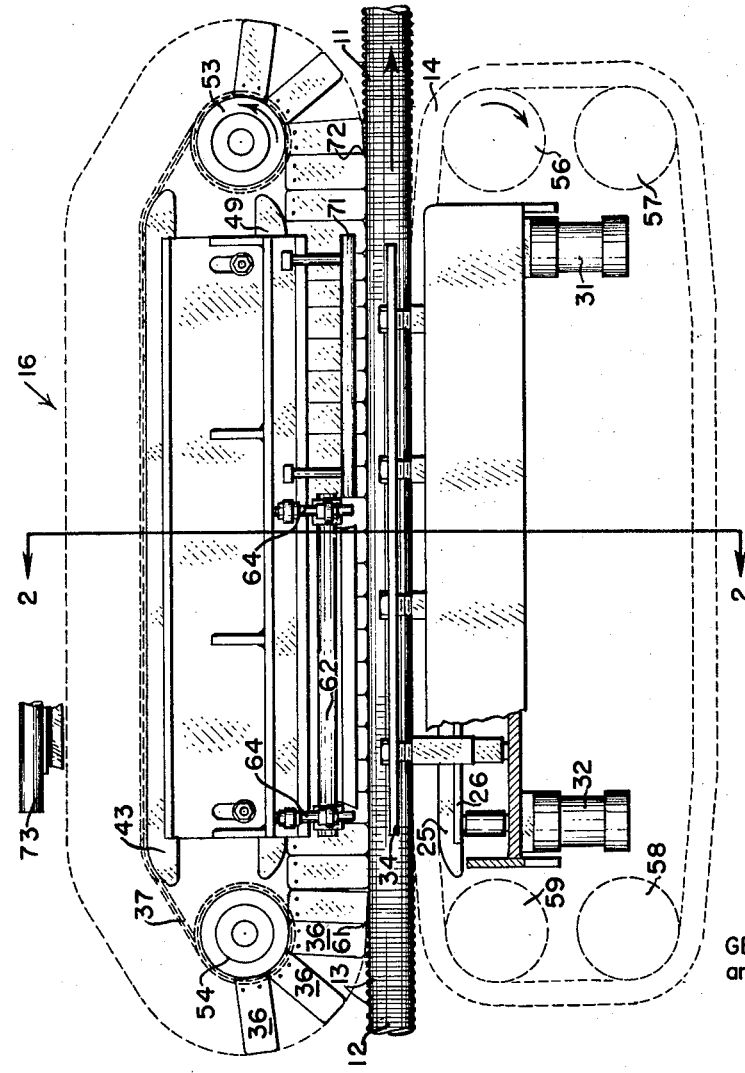
INVENTORS
GEORGE N. MENASOFF
and BERND W. HAASE
THEIR AGENT United States Patent Office 3,186,618
Patented June 1, 1965

3,186,618
SEALING APPARATUS
George N. Menasoff, Tarrytown, and Bernd W. Haase, New York, N.Y., assignors, by mesne assignments, to Anaconda Wire and Cable Company, a corporation of Delaware
Filed Nov. 30, 1961, Ser. No. 155,997
7 Claims. (Cl. 228—26)

Our invention relates to apparatus for forming a continuous seam in an elongated article and particularly to such apparatus where the seam is a overlapped soldered seam.

It is known in the manufacture of electric cables to enclose such cables in a protective metal sheath such as a steel sheath, which may or may not be corrugated. This may be accomplished by folding a strip of the sheathing material continuously around the cable in such a manner that the edges of the strip overlap to form a longitudinal seam on the cable surface. A narrow strip of solder is sandwiched between the underlying and overlying sheathing material at the overlapped area and the sheath is heated to melt the solder and thereby seal the seam.

In known types of cable sheathing apparatus heat is applied to the cable sheath by an induction coil while the cable seam is advanced in sliding contact with stationary shoes that hold the overlapped seam together. Serious disadvantages of this known apparatus are the facts that continuous rubbing contact against the shoes wears grooves therein, that electrical arcing occurs between the induction coil and the cable sheath, that, particularly in the case of corrugated sheath, pressure between the shoes and the sheath tends to distort the shape of the latter, and that high frequency inductive heating of non-magnetic material such as copper is too slow for the purposes of commercial production.

We have overcome all the above-mentioned disadvantages by inventing apparatus for forming a continuous overlapped seam in an elongated article such as a cable sheath, comprising a seam sealing station and means for advancing the article past said station. A plurality of pressure members, which may be plates, are assembled in an endless array at the station, and our apparatus comprises means for urging the pressure members and the seam together while advancing them at the same speed as the article, and means for heating and preferably quenching the seam while it is held closed by the pressure members. We have provided means such as hydraulic cylinders on the side opposite the pressure members for urging a cable against said members. As a means for melting the solder our apparatus preferably comprises at least one gas jet impinging so as to heat the seam and means for supplying combustible gas to said jet. We have invented an apparatus as above, which is particularly suitable for sealing cable sheath, comprising at least two gas jets impinging on the sheath on opposite sides of the pressure members and means for preheating the pressure members prior to their urging against the seam. In a preferred embodiment of our invention our apparatus comprises pressure plates preheated by gas jets, a conveyor for supporting and advancing an electric cable, and at least one air cylinder urging the conveyor and cable against the pressure plates.

A more complete understanding of our invention may be obtained by studying the appended drawing.

In the drawing:

FIGURE 1 is a side elevation of an apparatus made to our invention.

FIGURE 2 is a section through the line 2—2 of FIGURE 1.

Referring to FIGURES 1 and 2 a cable 11 comprising a copper sheath 12 having corrugations 13 is carried by a conveyor 14 past a station indicated generally at 16. Although we have shown a corrugated copper-sheathed cable it will be understood that our invention is not limited thereto but can also be used for cables sheathed with steel, bronze and other metals and for sheaths that are flat rather than corrugated. Corrugated copper sheaths are, however, particularly difficult to seal by kown means because the corrugations do not afford much contact area for the transfer of heat and the non-magnetic high electrical conductivity metal is difficult to heat by induction. The conveyor 14 is in the form of a segmented endless neoprene belt having a T-shape most clearly shown in FIGURE 2 with an upper flat 17 and narrow base 18. Rollers 21, 22 are fixed at spaced intervals to either side of the base 18 by pin shafts such as a shaft 23. The rollers 21, 22 ride respectively on tracks 24, 25 mounted on a plate 26 in a frame 27 having a slide fit within guide walls 28, 29 fixed at the station 16. The frame 27 is urged upward by two air cylinders 31, 32.

The cable 11 is centered on the flat 17 by means of guide plates 33, 34 supported on the frame 27 and moving therewith. By means of the slide mounting of the frame 27 and the lifting of the air cylinders 31, 32 our apparatus is enabled to accommodate cables 11 of different diameters.

A plurality of rectangular pressure plates 36 are attached by one of their short edges to an endless band 37. In the preferred embodiment of our invention shown in the drawing the band 37 is a link chain with rods 38 two of which pass through each of the plates 36 and links 39. The rods 38 are mounted in rollers 41, 42 which ride on upper tracks 43, 44 and lower tracks 46, 47. The tracks 46, 47 are opposed respectively by elongated blocks 48, 49 which prevent the plates from moving upwardly due to the force exerted by the air cylinders 31, 32. The sheath 12 has an overlapping portion 51 and beneath the overlapping portion 51 there is a strip of solder 52. The solder 52 may be introduced into the sheath 12 by any of a number of known methods. Although we have shown a separate strip 52 of solder it will be understood that the sealing means may be a coating rather than a discrete strip and may be a heat sensitive resinous adhesive rather than a metallic solder, without leaving the bounds defined by our invention. We prefer to make the plates 36 of stainless steel but it will be recognized that other metals, or even ceramic or plastic materials having the necessary strength and resistance to repeated cycles of heating and cooling may also be used. The link-belt band 37 is driven by a sprocket 53 powered by a means not shown, over an idler 54. The conveyor 14 is driven by friction pulleys 56, 57, 58, 59 also powered by means not shown. The speed of the conveyor 14 matches the speed of the band 37 so that the plates 36 have the same speed as the cable 11. As the plates 36 approach the cable 11 at a point 61 they compress the overlap 51 against the solder 52 with a degree of pressure that is determined by the pressure in the air cylinders 31, 32. Thus the pressure can be adjusted so as to adequately compress the overlap 51 forming a seam in the cable sheath without distorting the shape of the cable or the corrugations. Two gas burner manifolds 62, 63 are fastened at the station 16 by brackets 64 fixed to the tracks 46, 47. A plurality of nozzles 66, connected to the manifold 63, direct gas jets 67 to impinge on the sheath 12 adjacent to the overlapping portion 51 so that heat is carried by conduction into the overlap. Another plurality of nozzles 68, connected to the manifold 62 direct gas jets 69 that impinge on the sheath 12 on the opposite side of the plates 36. Heat from the jets 69 is carried by conduction to the portion of the sheath 12 underlying the solder 52. We prefer the jets 67, 69 to be a plurality of fine jets directed close to the plates 36. Jets of the type described are especially effective for heating corrugated sheaths since they will impinge into the valleys as well as the crests. During the period that the solder 52 is melted by heat from the jets 67, 69 the seam will be held closed by the plates 36 moving with the cable 11. A quenching manifold 71 is shown in the FIGURE 1 and there is another manifold on the opposite side of the cable. Water sprays from the manifold 71 serve to quench and harden the solder 52 while the overlap 51 is still being held down by the pressure members 36. At a point 72 the plates 36 release pressure from the sheath but at this point the solder has hardened and the seam is firmly sealed. The plates 36 will have been cooled somewhat by the spray from the water manifold 71 and we have provided another gas manifold 73 with nozzles 74 directing jets 75 against the edges of the plates 36 to evaporate off any water and preheat the plates 36 prior to their renewed contact with the sheath 12.

We have invented a new and useful apparatus for sealing seams in elongated articles for which we dseire the award of Letters Patent.

We claim:

1. Apparatus for forming a continuous overlapped seam in an elongated article comprising a seam sealing station, means for advancing said article past said station, a plurality of pressure members assembled in an endless array at said station, means on the opposite side of said article from said pressure members for urging said seam in contact against said pressure members, means simultaneously advancing said members at the same speed as said article, and means for heating said seam while said seam is in contact against said advancing pressure members.

2. Apparatus for forming a continuous overlapped soldered seam in the metallic sheath of an electric cable comprising a seam sealing station, means for adavncing said cable past said station with said seam uppermost, an endless band mounted above said cable at said station, a plurality of pressure members fastened vertically to said band, means underneath said cable for urging said pressure members and said seam together, means simultaneously advancing said members in contact with said seam at the same speed as said cable, at least one gas jet at said station impinging on said sheath in proximity to said seam advancing with said members, and means for supplying combustible gas to said jet.

3. Apparatus for forming a continuous overlapped soldered seam in the metallic sheath of an electric cable comprising a seam sealing station, means for advancing said cable past said station, a plurality of pressure members assembled in an endless array at said station, means for urging said seam in contact against said pressure members, means simultaneously advancing said members at the same speed as said cable, at least two gas jets at said station impinging on said sheath in proximity to said seam on the opposite sides of said pressure members, and means for supplying combustible gas to said jets.

4. Apparatus for forming a continuous overlapped soldered seam in an elongated article comprising a seam sealing station, means for advancing said article past said station, a plurality of pressure members assembled in an endless array at said station, means for urging said seam against said pressure members, means simultaneously advancing said members at the same speed as said article, means for heating said seam while said seam is being held closed by said pressure members and means for quenching said seam while said seam is still being held closed by said pressure members.

5. Apparatus for forming a continuous overlapped soldered seam in the metallic sheath of an electric cable comprising a seam sealing station, means for advancing said cable past said station, a plurality of pressure members assembled in an endless array at said station, means for urging said seam against said pressure members, means simultaneously advancing said members at the same speed as said cable, means for heating said sheath while said members are holding said seam closed, means for quenching said seam, and means for preheating said pressure members prior to their urging against said seam.

6. Apparatus for forming a continuous overlapped soldered seam in the metallic sheath of an electric cable comprising a seam sealing station, a conveyor supporting said cable and advancing said cable past said station with said seam uppermost, an endless band mounted above said cable at said station, a plurality of pressure plates fastened to said strand and in endwise pressure contact with said seam at said station, at least one air cylinder urging said conveyor and said cable against said pressure plates, means for advancing said conveyor and said band at equal speeds, two rows of fine gas jets impinging on said sheath at opposite sides of said pressure plates, two quenching sprays impinging on said seam at opposite sides of said pressure plates, at least one gas jet impinging on said pressure plates at a point prior to their urging against said seam, means supplying combustible gas to said gas jets and means supplying water to said quenching sprays.

7. Apparatus for forming a continuous overlapped soldered seam in the metallic sheath of an electric cable comprising a seam sealing station, means advancing said cable past said station with said seam uppermost, an endless band mounted above said cable at said station, a plurality of vertical pressure plates fastened to said band, means urging said plates in edgewise contact against said seam at said station, means advancing said band with said plates attached thereto at the same speed as said cable, at least one gas jet at said station impinging so as to heat said seam while said seam is advancing in contact with said plates, and means supplying combustible gas to said jet.

References Cited by the Examiner

UNITED STATES PATENTS

| | | | |
|---|---|---|---|
| 452,584 | 5/81 | Senaca | 113—72 |
| 1,124,763 | 1/15 | Lloyd | 113—129 |
| 1,739,757 | 12/29 | Hand | 113—127 XR |
| 2,089,029 | 8/37 | Jones | 113—131 XR |
| 2,090,744 | 8/37 | Boe | 113—33 XR |
| 2,223,312 | 11/40 | Briggs | 113—98 |
| 2,430,219 | 11/47 | Elser | 113—98 XR |
| 2,740,519 | 4/56 | Sparks | 29—156.5 |
| 2,792,799 | 5/57 | Dahlstrom | 113—102 XR |
| 2,879,587 | 3/59 | Mushovic et al. | 29—497.5 XR |

CHARLES W. LANHAM, *Primary Examiner.*

JOHN F. CAMPBELL, *Examiner.*